United States Patent
Shriram et al.

(10) Patent No.: US 7,813,351 B2
(45) Date of Patent: Oct. 12, 2010

(54) AVAILABLE BANDWIDTH ESTIMATION

(75) Inventors: Alok Shriram, Chapel Hill, NC (US);
Sujata Banerjee, Sunnyvale, CA (US);
Praveen Yalagandula, Redwood City, CA (US); Sung-Ju Lee, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 355 days.

(21) Appl. No.: 11/787,008

(22) Filed: Apr. 13, 2007

(65) Prior Publication Data

US 2008/0253286 A1 Oct. 16, 2008

(51) Int. Cl.
*H04L 12/26* (2006.01)
*H04L 12/28* (2006.01)
*H04L 12/56* (2006.01)
*G06F 15/173* (2006.01)

(52) U.S. Cl. .......... 370/395.41; 370/252; 370/254; 709/223

(58) Field of Classification Search .......... 370/252, 370/254, 395.41, 232; 709/230, 223–226
See application file for complete search history.

(56) References Cited

U.S. PATENT DOCUMENTS

| | | | | |
|---|---|---|---|---|
| 6,088,722 A * | 7/2000 | Herz et al. | ............ | 709/217 |
| 2002/0075941 A1 * | 6/2002 | Souissi et al. | ............ | 375/133 |
| 2003/0202468 A1 * | 10/2003 | Cain et al. | ............ | 370/229 |
| 2003/0204623 A1 * | 10/2003 | Cain | ............ | 709/241 |
| 2004/0059830 A1 * | 3/2004 | Brown | ............ | 709/238 |
| 2004/0264466 A1 * | 12/2004 | Huang | ............ | 370/392 |
| 2005/0002372 A1 * | 1/2005 | Rune et al. | ............ | 370/346 |
| 2005/0111487 A1 * | 5/2005 | Matta et al. | ............ | 370/468 |
| 2005/0120105 A1 | 6/2005 | Popescu et al. | | |
| 2005/0122955 A1 * | 6/2005 | Lin et al. | ............ | 370/351 |
| 2005/0213550 A1 * | 9/2005 | Krishnan et al. | ............ | 370/338 |
| 2007/0160016 A1 * | 7/2007 | Jain | ............ | 370/338 |

OTHER PUBLICATIONS

Ningning Hu, Peter Steenkiste, Exploiting Internet Route Sharing for Large Scale Available Bandwith Estimation (2005).
Mavromoustakis C X et al—"Bandwidth clustering for reliable and pioritized network routing using split-agent-based method"—IEEE-DCS Workshops 2005—pp. 89-94.
Dhuransher S K et al—"Weight based adaptive clustering in wireless ad hoc networks"- ICPWC 2005—pp. 95-100.

* cited by examiner

*Primary Examiner*—Pankaj Kumar
*Assistant Examiner*—Hicham B Foud

(57) ABSTRACT

Feature vectors for nodes in a network are computed based on a network metric. Clusters of the nodes are formed based on the feature vectors. A cluster head is selected for each cluster. Available bandwidths between the cluster head and nodes outside the cluster are determined. The available bandwidths between the cluster head and the nodes outside the cluster may be used as estimations of available bandwidths for the nodes in the cluster.

15 Claims, 5 Drawing Sheets

AVAILABLE BANDWIDTH ESTIMATION

BACKGROUND

Large networks, such as the Internet, provide the infrastructure for many peer-to-peer systems and are now being used to provide a variety of services to users. Some recent Internet applications require high bandwidth. Live, high-quality, streaming video, video conferencing, and graphic-intensive multiplayer games are examples of high-bandwidth applications.

A fundamental challenge in effectively utilizing high-bandwidth network services is to provide these services and other data transmission without affecting the quality of the services. Quality of Service (QoS) routing is a major factor in providing these services. However, selecting routes that provide the performance required by the service is difficult.

Accurately measuring metrics for computing network routes can be difficult. This is especially true when determining bandwidth. Measuring bandwidth is a computational and resource intensive process. It is difficult to conduct bandwidth measurements for large networks, such as the Internet, having a large number of paths. Measuring simultaneously on multiple paths may cause interference to measurement tools and may generate cross traffic, thus making it difficult to get accurate measurements in real-time. Furthermore, bandwidth changes quite rapidly and the measurements need to be updated frequently. In a large network, continuously measuring bandwidth would be infeasible because of the large measurement overhead.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

Figure 1:
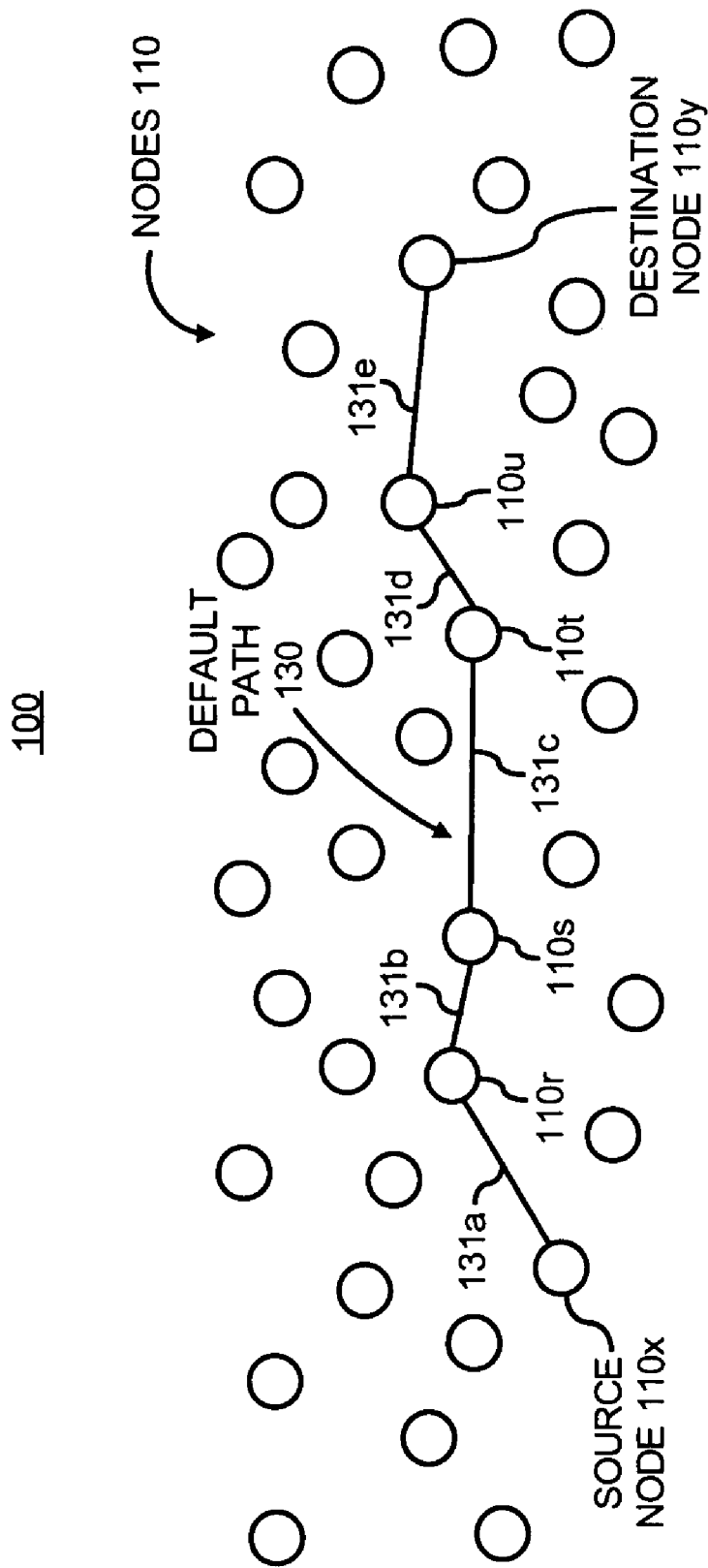
FIG. 1 illustrates a network including nodes, according to an embodiment.

According to embodiments described herein, efficient and scalable methods for estimating available bandwidth for an end-to-end path are provided. In one embodiment, a relatively stable network metric, when compared to available bandwidth, is used to identify clusters of nodes that are likely to have similar available bandwidths to other nodes in the network. Examples of a stable network metric include but are not limited to capacity and last m-hops in network paths. A representative node is selected from each cluster, referred to as the cluster head, and available bandwidth is measured from the cluster head to all other nodes in the network outside the cluster. The measured available bandwidth from the cluster head may be used as an estimation of available bandwidth from each of the nodes in the cluster. Thus, much fewer available bandwidth measurements are performed to determine available bandwidth between all the nodes in a network. This represents a significant savings in terms of network traffic and time to determine available bandwidth between the nodes in a network.

After the available bandwidths between the nodes are determined, the available bandwidths may be stored, displayed or conveyed to a user or another node in the network. The available bandwidths may be used to select a path for transmitting data to a destination. In one example, the available bandwidths are used to select a path that meets the requirements for providing a service. For example, a service provided to a user over a network, such as the Internet, may require a minimum available bandwidth. A path is selected in the network that has an available bandwidth greater than or equal to the required minimum available bandwidth. Other network metrics, such as latency, throughput, loss rate, etc., in addition to available bandwidth, may be considered when selecting a path.

As used herein capacity is the maximum transmission rate of a data transmission on a link or end-to-end path, assuming the data transmission has full access to the link or path without any other network traffic on the link or path. Capacity measurements create network traffic. However, a capacity measurement is typically valid for a much longer period of time, so the periodicity of performing these measurements to be used for determining available bandwidth is less.

Available bandwidth is the transmission rate of a data transmission on a link or path with other network traffic on the link or path. The network traffic typically varies over time, so the available bandwidth varies over time and is generally less stable than capacity.

Equation 1 provides a more formal description of available bandwidth for a path as the minimum unused capacity of the path during a time interval $(t_1, t_2)$.

Equation 1:

$$AB[t_1, t_2] = C - \frac{B(t_1, t_2)}{t_2 - t_1}$$

In Equation 1, AB is the available bandwidth in bits per second (bps) for the time interval $(t_1, t_2)$, C is the capacity of the path and B is the measured traffic on the path during the time interval.

An end-to-end path in a network between a source and a destination, also referred to as a path or network path, may be comprised of one or more links. The available bandwidth or capacity of a path comprised of multiple links may be characterized by the link in the path having the lowest capacity or lowest available bandwidth. This link may be referred to as the bottleneck link.

FIG. 1 illustrates a network 100 including nodes. An example of the network 100 includes a large-scale network, such as the Internet. However, the embodiments may be implemented in smaller networks.

A node is any device that may send and/or receive messages via the network and that is typically operable to perform some type of data processing. Examples of nodes include routers, servers, and end-user devices, such as personal digital assistants (PDAs), personal computers, laptops, and cellular phones. The nodes 110 may be operable to route data in the network 100 along network paths.

FIG. 1 shows a source node 110x and a destination node 110y. A path 130 between the source node 110x and the destination node 110y includes links 131a-e and intermediate nodes 110r-u. The path 130, for example, is an IP network path for routing data between the source node 110x and the destination node 110y, as is known in the art.

The slowest link of the path 130 determines the maximum available bandwidth of the entire path 130. For example, if the available bandwidths for the links 131a-e are 20, 50, 100, 30 and 1 Mbps respectively, the maximum available bandwidth for the path 130 is 1 Mbps. If a service, such as streaming media, or a bulk transfer of data to be provided to the destination node 110y requires over 1 Mbps to provide the service, the path 130 may not be selected to provide the service if another path to the destination node 110y with available bandwidth greater than 1 Mbps is available for providing the service. For example, another path and/or another source providing the same service may be used to provide the service. The path 130 may be selected if the service requires less than or equal to 1 Mbps available bandwidth. Similarly to available bandwidth, the link having the lowest capacity in the path 130 may be used as the maximum capacity of the entire path 130.

Figure 2A:
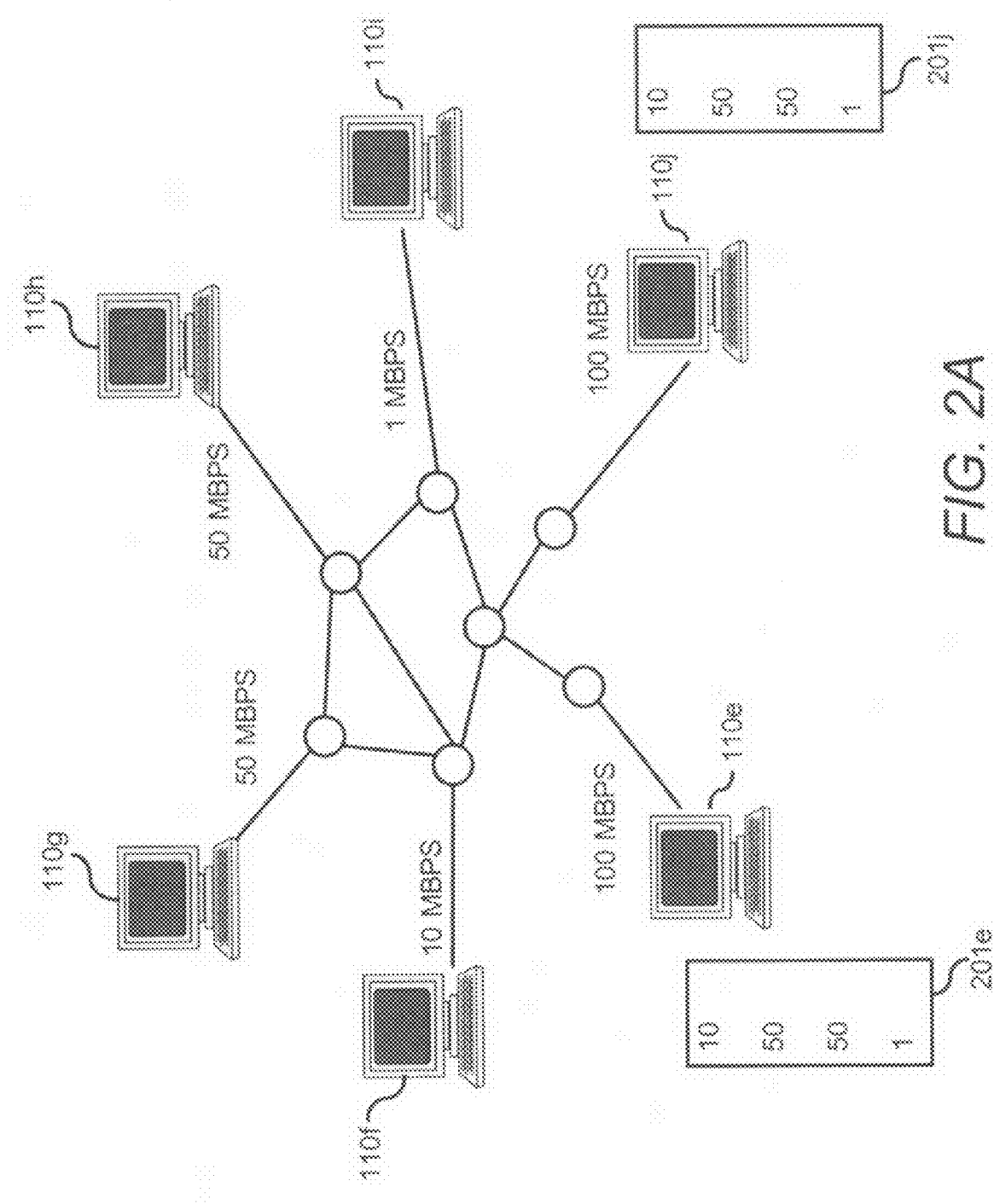
FIGS. 2A-B illustrate examples of nodes that may and may not be clustered, according to an embodiment.
Figure 2B:
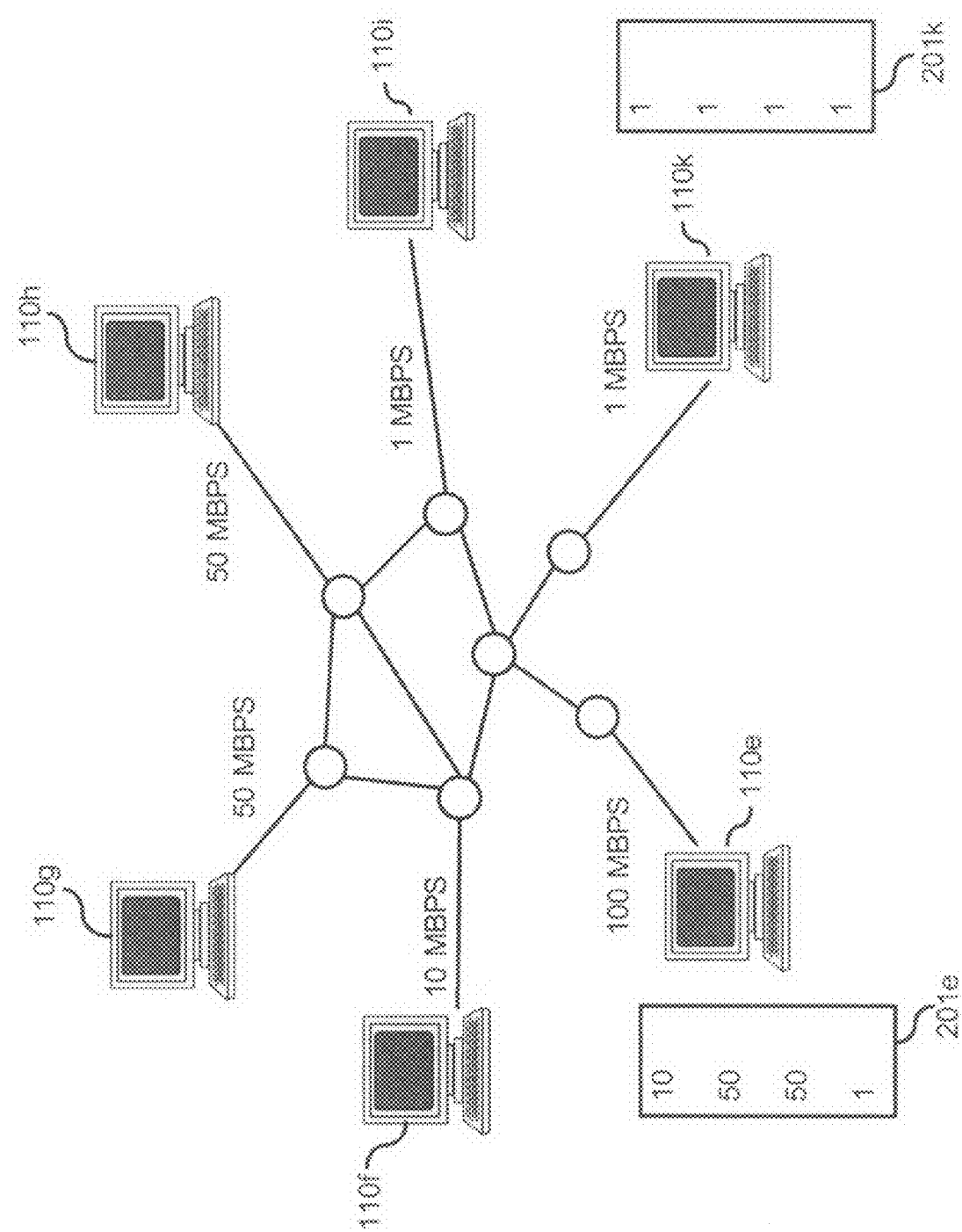

According to an embodiment, nodes are clustered to estimate available bandwidth with reduced overhead. Nodes are clustered based on the sameness of their view of the network in terms of a network metric, such as bandwidth, capacity, last m-hops, etc. FIGS. 2A-B illustrate examples of nodes that can or cannot be clustered based on their views of the network.

FIG. 2A illustrates nodes 110e-j in the network 100. Each of the nodes 110e-j measures a network metric, in this example bandwidth, to all the other nodes. FIG. 2A shows the measured bandwidths, which are access bandwidth for each of the nodes. The access bandwidth is the transmission rate on the link closest to the node providing access to the network. In the examples shown in FIGS. 2A-B, the lowest bandwidth of any path (i.e., the bandwidth of the bottleneck link in the path) happens to be the access bandwidth of one of the two end nodes of the path, and thus the minimum of the end nodes' access bandwidths may be considered as the bandwidth for the entire path. As shown in FIG. 2A, the access bandwidths for the nodes 110e-j are 100, 10, 50, 50, 1 and 100 Mbps, respectively.

The view of the network for the node 110e, shown as 201e, is the bandwidth for each of the paths from the node 110e to the nodes 110f-i, respectively in this example. The view 201e includes 10, 50, 50, and 1 Mbps, which are the bandwidths for the paths between the node 110e and the nodes 110f-i, respectively. Similarly, the view of the network for the node 110j, shown as 201j, includes 10, 50, 50, and 1 Mbps, which are the access bandwidths for the nodes 110f-i, respectively. The view 201j represents the bandwidth for each of the paths from the node 110e to the nodes 110f-l, respectively. The views 201e and 201j are the same, and thus the nodes 110e and 110j may be clustered for estimating available bandwidth.

FIG. 2B is an example of nodes that cannot be clustered. As shown in FIG. 2B, the view of the network for the node 110e, shown as 201e, includes 10, 50, 50, and 1 Mbps, as described above. The view 201k for the node 110k is 1, 1, 1, 1 Mbps, which are the bandwidths for the paths between the node 110k and the nodes 110f-i, respectively. The bandwidth is 1 Mbps for each path because that is the bandwidth of the bottleneck link of each path. The views 201e and 201k are substantially different. Thus, the nodes 110e and 110k may not be clustered.

The examples shown in FIGS. 2A-B are simplistic and it will be apparent to one of ordinary skill in the art that other metrics may be used to determine views of the network. Furthermore, views may not exactly match, but may still be considered close enough for placing the respective nodes in the same cluster. Criteria for comparing views to determine whether to place nodes in the same cluster are described in further detail below.

Through testing, it has been observed that many paths in a large network, such as the Internet, are shared. Also, most bottleneck links are in the first or last four hops in a path between a source and destination node. Also, tight and narrow links in a path are the same. A tight link is a link in a path with the smallest capacity. A narrow link is a link in a path with the smallest available bandwidth. Based on these observations, clustering approaches for determining available bandwidth for a path, according to embodiments, is described with respect to FIG. 3.

Figure 3:
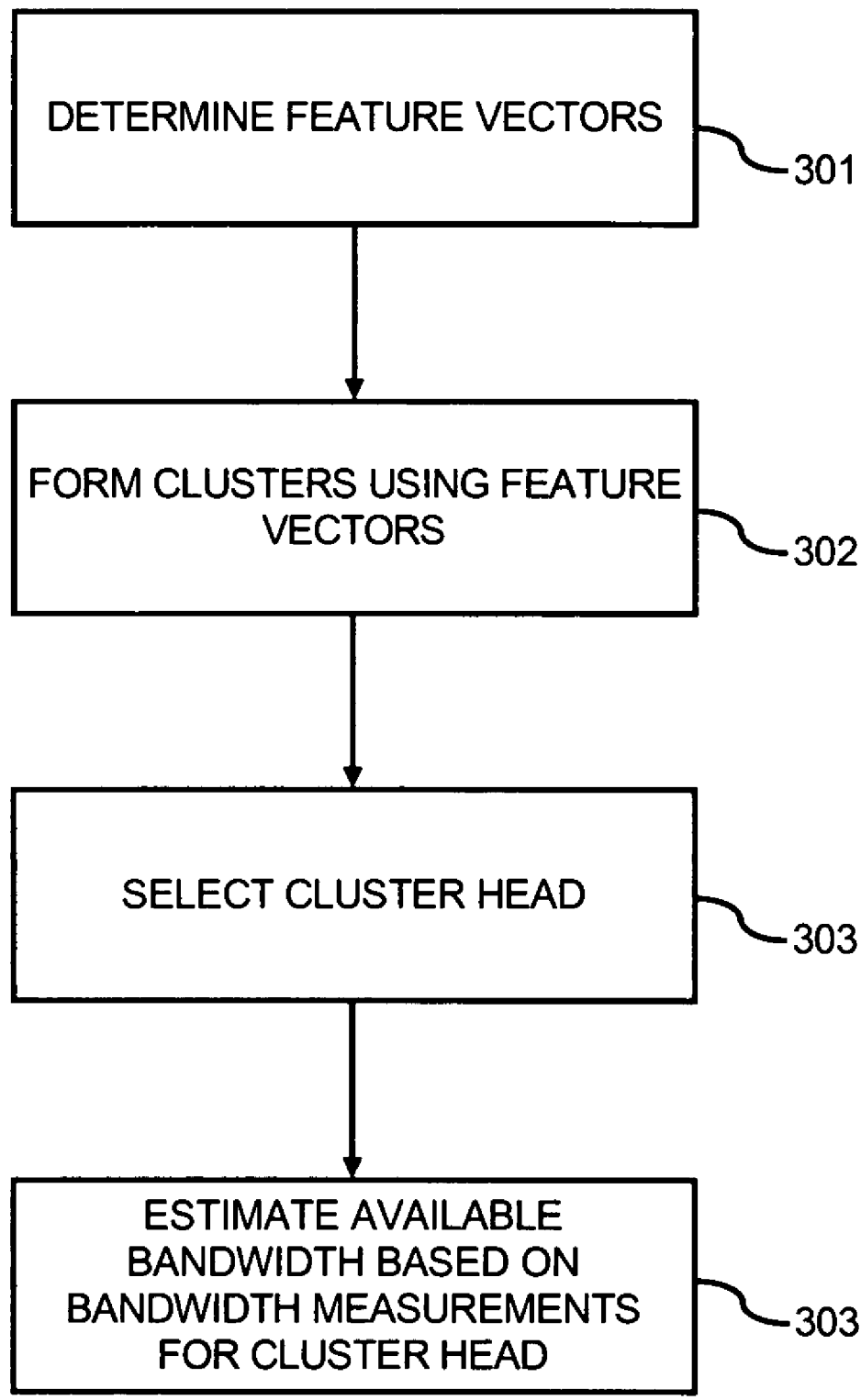
FIG. 3 illustrates a flow chart of a method for estimating available bandwidth, according to an embodiment.

FIG. 3 illustrates a method for estimating available bandwidth using a clustering approach. FIG. 3 is described with respect to FIGS. 1 and 2A-B by way of example and not limitation.

At step 301, feature vectors are determined for each node. The views 201e, 201j, and 201k are examples of feature vectors. For example each node measures a network metric between itself and every other node in the network or a set of nodes in the network. The measurements are the feature vector. The views 201e, 201j, and 201k shown in FIGS. 2A-B are examples of feature vectors and the network metric is bandwidth for those feature vectors.

In one embodiment, the feature vectors include capacity measurements. For example, the nodes 110e-j shown in FIG. 2A each measure capacity to each other to determine feature vectors for each of the nodes. Bandwidth and capacity measurement tools known in the art may be used to perform the measurements.

Capacity measurements create network traffic. However, capacity is a relatively stable network metric and is typically valid for a much longer period of time, when compared to other metrics, such as available bandwidth, which are dependent on current network traffic. Thus, the periodicity of performing capacity measurements for feature vectors to be used for determining available bandwidth is less. Furthermore, since it has been observed that tight and narrow links in a path tend to be the same, capacity may be leveraged to determine available bandwidth for a path.

In another embodiment, the feature vectors include the last m-hops for each path. For example, each of the nodes 110e-j shown in FIG. 2A perform traceroutes to each other. The traceroutes are used to determine the last m-hops for each path between each of the nodes 110e-j. For example, if m=4, the feature vector for the node 110e includes the last 4 hops in each path between the node 110e and the nodes 110f-i. This may include a unique ID of the last four nodes in each path or some other representation of the last four nodes in each path. Since it has been observed that many paths in a large network are shared, nodes that are common for two different paths may be used as the metric for clustering.

At step 302, the feature vectors are used to form clusters. Clusters are formed based on the "sameness" of the nodes view of the network in terms of a network metric, such as capacity, last hops in a path, etc. Sameness is determined from the feature vectors and distance metrics computed from the feature vectors as described below.

According to an embodiment, feature vectors are comprised of capacity measurements. Using the capacity measurements, a distance metric between any two given nodes in the network is computed to determine sameness between the nodes and to form clusters. For example, given a node pair and assuming n number of nodes are in the network, the distance metric is the average of the normalized differences between the capacity from the first node in the pair and the capacity from the second node in the pair to each other (n−2) nodes. For example, two nodes, such as the node 110e and the node 110j, shown in FIG. 2A, are being compared. Assuming the network 100 includes n number of nodes, the average of the normalized differences between the capacity from node 110e and the capacity from the node 110j to each of the other (n−2) nodes is computed. This computation is performed for every node pair. The result for each computation, for example, is a number between 0 and 1. Depending on where the threshold is set, the pair is either placed in the same cluster or not. Alternatively, the computation results are used as input to a known clustering function, such as k-means clustering, and the function determines the clusters.

Computing the distance metric for each pair of nodes is as follows: given n number of nodes in the network, a computation is performed for each node pair (i, j). At step 301, for example, capacity is measured from each of the nodes i and j to every other node in the network to determine the feature vectors. A capacity measurement from the node i to a node k is represented as $Cap(N_{i,k})$, and $Cap(N_{j,k})$ represents the capacity measurement from the node j to node k in the network. A difference is computed. The difference is the capacity from node i to node k minus the capacity from node j to node k. The difference is divided by the maximum of the capacities from node i to node k and from node j to node k. This computation is represented by Equation 2 as follows:

Equation 2:
$$Diff_{i,j}^k = \frac{|Cap(N_{i,k}) - Cap(N_{j,k})|}{\text{Max}(Cap(N_{i,k}), Cap(N_{j,k}))}$$

The difference calculated in equation 2 is averaged across all other (n−2) nodes in the network. Thus, equation 2 is calculated for each node k, where k represents the nodes in the network other than the nodes i and j. The number of nodes k is (n−2). The computation for averaging the differences across all other (n−2) nodes is shown in Equation 3 as follows:

Equation 3:
$$\frac{\sum_{\forall k \neq i,j} Diff_{i,j}^k}{(n-2)}$$

The normalized difference calculated in Equation 3, for example, is a number between 0 and 1 and is the distance metric for the pair. If the capacities are the same, then the difference is 0 and then the nodes i and j have the same view and are placed in the same cluster. Generally, if the normalized difference is closer to 0, the nodes are placed in the same cluster. If the normalized difference is closer to 1, the nodes are not placed in the same cluster. In one embodiment, the results of Equation 3 for each node pair in the network are used as input to a known clustering function, such as k-means clustering, and the function determines the clusters.

The distance metric may be calculated for a subset of nodes in the network instead of all the nodes in the network. For example, n is a number of nodes in the subset of nodes in the network; (n−2) is a number of the nodes in the subset except for the node pair; and k represents each node in the subset.

According to another embodiment, paths are used to determine feature vectors. For example, as described above, the last m-hops to all destination nodes are provided in the feature vectors for each node. A distance metric representing path similarity is calculated, which measures the fraction of nodes that are common between the routes from two nodes in a node pair to a common destination and averages over all destinations. Any standard clustering technique may then be applied to obtain the clusters. A distance metric of 1 implies nodes can be clustered and a distance metric of 0 implies nodes cannot be clustered.

Computing the distance metric for each pair of node is as follows: given n number of nodes in the network, a computation is performed for each pair of source nodes i and j. and a destination node k. At step 301, for example, the last m-hops are determined for the two paths between nodes i and k and nodes j and k. For each of the hops h ranging from 1 to m, a hop similarity function $HS_{i,j}^k(h)$ is computed as shown in Equation 4 as follows, where $N_{i,k}^h$ and $N_{j,k}^h$ are the node id's for the $h^{th}$ hop on the paths between nodes i and k and nodes j and k respectively. Note that $N_{i,k}^h$ and $N_{j,k}^h$ could be part of $k^{th}$ entry in the feature vectors for nodes i and j as discussed before.

$$HS_{i,j}^k(h)=1 \text{ if } (N_{i,k}^h=N_{j,k}^h) \text{ else } HS_{i,j}^k(h)=0 \qquad \text{Equation 4}$$

For example, for m=4, in computing the feature vector for a node i, the intermediate nodes at the last 4 hops ($h_0$, $h_1$, $h_2$, $h_3$) to each destination node k are used. Assume that the last four hops from node i to the node k are 110h, 110i, 110j and 110k, and the last four hops from node j to the node k is 110h, 110i, 110x, 110y. The results of equation 4 for nodes i and j with respect to destination k is 1, 1, 0, and 0, because $h_0$ and $h_1$ are the same in both feature vectors and $h_2$ and $h_3$ are different.

The path similarity (PS) of two paths from node i to k and node j to k is computed as a function of the sum of $HS_{i,j}^k(h)$ for each of the m hops as follows:

Equation 5:
$$PS_{i,j}^k = \frac{\sum_{h=1}^{m} HS_{i,j}^k(h)}{m}$$

In the example above where the last four hops from node i to the node k are 110h, 110i, 110j and 110k and the last four hops from node j to the node k are 110h, 110i, 110x, 110y, the result of equation 5 is 2/4.

$PS_{i,j}$ is averaged over the set of all other destination nodes k, such that k≠i, j. The normalized PS is the distance metric and is calculated using Equation 6:

Equation 6:
$$PS_{i,j} = \frac{\sum_{\forall k \neq i,j} PS_{i,j}^k}{(n-2)}$$

Thus, at step 302, a distance metric matrix including the distance metric for every node pair is created. If a known clustering function, such as k-means clustering function, is used to form the clusters, the distance matrix metric along with the number of clusters to be formed is input into the clustering function to form the clusters of nodes.

At step 303, a cluster head is selected for each cluster. For example, once the clusters are created, each cluster elects its cluster representative, i.e., the cluster head, which then conducts bandwidth measurements to the nodes outside the cluster. The cluster representative may be chosen by a number of techniques.

In a direct approach for determining the cluster head, the cluster head is chosen, for example randomly, and available bandwidth measurements from the cluster head are considered estimations from all the nodes in the cluster.

Available bandwidth measurements are also performed to obtain the bandwidths between the nodes inside each cluster. These measurements may be used to identify a bottleneck link close to the source and for selecting a cluster head using a second approach, referred to as the min-use approach. In this approach, if available bandwidth between a node in the cluster, referred to as a source node in the cluster, and the cluster head is less than the available bandwidth between the cluster head and a node outside the cluster, referred to as a destination node outside the cluster, the available bandwidth between the source node in the cluster and the cluster head is used as the estimation of available bandwidth between the source node and that destination node. The min-use approach accounts for bottleneck links that may be closer to the source node rather than the destination node. These bottleneck links may be used as the estimation of available bandwidth from the nodes in the cluster. If the bandwidths between the cluster head and the nodes outside the cluster are smaller than the bandwidths between the nodes in the cluster and the cluster head, the bottleneck links may be close to the destination. Then, the bandwidths between the cluster head and the nodes outside the cluster may be used as the estimation of available bandwidth for the nodes in the cluster.

For example, nodes 110e and 110j are in the same cluster, and the node 110e is selected as the cluster head using the direct approach. The node 110e measures available bandwidths to all the nodes outside the cluster. Assume the node is 110g is outside the cluster. If the available bandwidth between 110e and 110g is 10 Mbps and the available bandwidth between 110e and 110j is 5 Mbps, then 5 Mbps may be used as the available bandwidth to the destination 110g from node 110j. If the available bandwidth between another node in the cluster and 110e is less than 5 Mbps, then that available bandwidth may be used as the available bandwidth to the destination 110g from that node.

At step 304, available bandwidth measurements from a single node in the cluster are used as an estimation of available bandwidth from all the nodes in the cluster.

Figure 4:
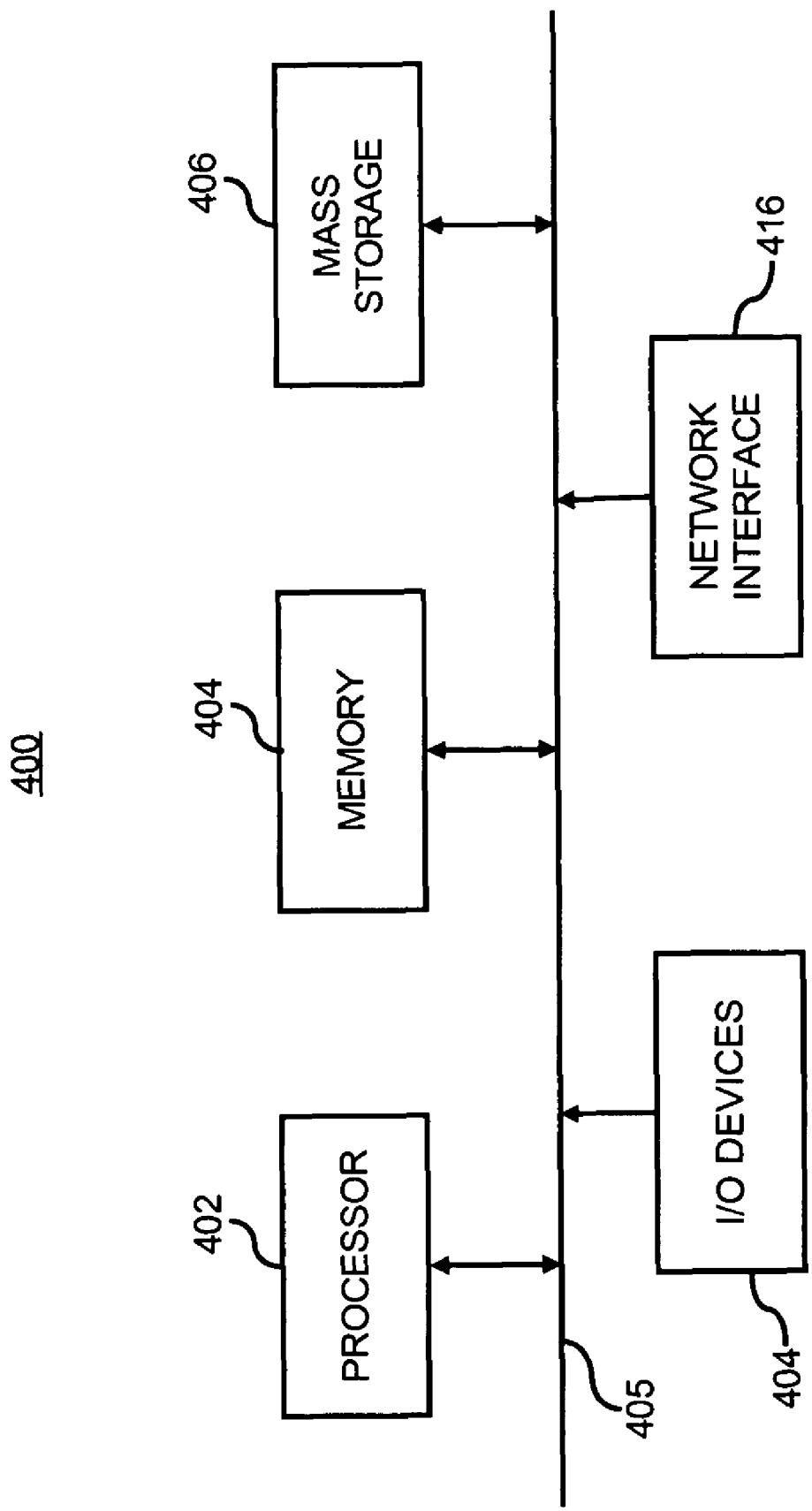
FIG. 4 illustrates a computer system, according to an embodiment.

FIG. 4 illustrates an exemplary block diagram of a computer system 400 that may be used as a node in the network 100. The computer system 400 includes one or more processors, such as processor 402, providing an execution platform for executing software.

Commands and data from the processor 402 are communicated over a communication bus 405. The computer system 400 also includes a main memory 404, such as a Random Access Memory (RAM), where software may be resident during runtime, and a secondary memory 406. The secondary memory 406 includes, for example, a hard disk drive and/or a removable storage drive, representing a floppy diskette drive, a magnetic tape drive, a compact disk drive, etc., or a nonvolatile memory where a copy of the software may be stored. The secondary memory 406 may also include ROM (read only memory), EPROM (erasable, programmable ROM), EEPROM (electrically erasable, programmable ROM). In addition to software for routing and other steps described herein, routing tables, capacities for overlay paths, available bandwidths for overlay paths, and other data may be stored in the main memory 404 and/or the secondary memory 406. The memories 404 and/or 406 may store network metric measurements, including feature vectors and measured available bandwidths.

A user interfaces with the computer system 400 with one or more I/O devices 404, such as a keyboard, a mouse, a stylus, display, and the like. A network interface 416 is provided for communicating with other nodes in the network 100.

One or more of the steps of the method 300 and other steps described herein may be implemented as software embedded on a computer readable medium, such as the memory 404 and/or 406, and executed on the computer system 400, for example, by the processor 402. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the scope of the claimed embodiments.

What is claimed is:

1. A method of estimating available bandwidth between nodes in a network, the method comprising:
  determining, feature vectors for each node based on a network metric;
  determining clusters of the nodes based on the feature vectors;
  selecting a cluster head for each cluster;
  for at least one cluster of the clusters, determining a first available bandwidth from the cluster head of the at least one cluster to a destination node outside the at least one cluster;
  determining a second available bandwidth between the cluster head of the at least one cluster and a source node in the at least one cluster;
  determining a minimum of the first available bandwidth and the second available bandwidth;
  using, by a computer, the minimum as an estimation of available bandwidth between the source node and the destination node; and
  using the minimum for communicating between the source node and the destination node.

2. The method of claim 1, wherein determining feature vectors comprises:
  measuring capacity from each node to every other node in the network to determine the feature vectors.

3. The method of claim 1, wherein determining feature vectors comprises:
determining last m-hops in paths between each node and every other node in the network to determine the feature vectors, where m represents one or more hops.

4. The method of claim 1, wherein determining clusters of the nodes based on the feature vectors comprises:
for every pair of the nodes, determining a sameness of the nodes based on the network metric; and
placing each pair of the nodes in the same cluster based on the sameness.

5. The method of claim 4, wherein determining a sameness comprises:
computing a distance metric from the feature vectors for each pair of nodes; and
determining the sameness for the pair of nodes based on the distance metric.

6. The method of claim 5, wherein determining clusters comprises:
using the distance metrics for all the node pairs as input to a clustering function to determine the clusters.

7. The method of claim 5, wherein every node pair is represented by a first node and a second node and there are n nodes in the network, and computing the distance metric comprises:
for each pair of nodes computing an average of a normalized difference between capacities from the first and second nodes to each one of other (n-2) nodes.

8. The method of claim 5, wherein the feature vectors comprise last m-hops, where m represents one or more hops, and every node pair is represented by a first node and a second node and there are n nodes in the network, computing the distance metric comprises:
for each pair of nodes computing a value indicative of a fraction of nodes that are common between routes from the first and second nodes to all other nodes in the network; and
averaging the values over n-2.

9. The method of claim 1, further comprising:
estimating available bandwidth for all the nodes in a cluster of the clusters based on bottleneck links close to each of the nodes outside the cluster in paths from the cluster head.

10. The method of claim 1, further comprising:
estimating available bandwidth for all the nodes in a cluster of the clusters based on bottleneck links close to the cluster head or close to other nodes in the cluster.

11. A computer program embedded on a non-transitory computer readable storage device, the computer program including instructions that when executed by a processor implement a method comprising:
determining feature vectors for each node of a plurality of nodes in a network based on a network metric of capacity;
determining clusters of the plurality of nodes based on the feature vectors,
wherein determining clusters of the plurality of nodes based on the feature vectors includes
for every pair of the nodes, determining a sameness of the pair based on the network metric and a distance metric computed from the feature vectors for the pair of nodes; and
placing each pair of the nodes in the same cluster based on the sameness,
wherein there are n nodes in the plurality of nodes in the network, and computing the distance metric includes
for each pair of nodes computing an average of a normalized difference between the capacity from each of a first node and a second node in the pair to each one of other (n-2) nodes, where n is a number of the plurality of nodes; selecting a cluster head for each cluster;
for each cluster, determining available bandwidths between the cluster head and nodes outside the cluster; and
using the available bandwidths between the cluster head and nodes outside the cluster as estimations of available bandwidths for the nodes in the cluster.

12. The computer program of claim 11, wherein determining clusters comprises:
using the distance metrics for all the pairs of nodes as input to a clustering function to determine the clusters.

13. A computer program embedded on a non-transitory computer readable storage device, the computer program including instructions that when executed by a processor implement a method comprising:
determining feature vectors for each node of a plurality of nodes in a network based on a network metric of last-m hops, where m represents one or more hops;
determining clusters of the plurality of nodes based on the feature vectors,
wherein determining clusters of the plurality of nodes based on the feature vectors includes
for every pair of the nodes, determining a sameness of the pair based on the network metric and a distance metric computed from the feature vectors for the pair of nodes; and
placing each pair of the nodes in the same cluster based on the sameness,
wherein there are n nodes in the plurality of nodes in the network, and computing the distance metric includes
for each pair of nodes computing a value indicative of a fraction of nodes that are common between routes from each of a first node and a second node in the pair to all other nodes of the plurality of nodes in the network; and
averaging the values over n-2, where n is a number of the plurality of nodes;
selecting a cluster head for each cluster;
for each cluster, determining available bandwidths between the cluster head and nodes outside the cluster; and
using the available bandwidths between the cluster head and nodes outside the cluster as estimations of available bandwidths for the nodes in the cluster.

14. A node of a plurality of nodes in a cluster, wherein the node is a cluster head of the cluster and the plurality of nodes are in a network, the node comprising:
a memory storing available bandwidth measurements between the node and nodes in the network outside the cluster; and
a processor operable to
determine a first available bandwidth from the cluster head to a destination node outside the cluster,
determine second available bandwidth between the cluster head and a source node in the cluster,
determine a minimum of the first available bandwidth and the second available bandwidth,
use the minimum as an estimation of available bandwidth between the source node and the destination node, and
use the minimum for communication between the source node and the destination node.

15. The node of claim 14, wherein the memory stores a feature vector of network metric values, and the network metric values are associated with network paths between the node and other nodes in the network, wherein the node is placed in a same cluster as all other nodes in the plurality of nodes based on a comparison of the feature vector for the node and the feature vectors for all the other nodes in the plurality of nodes in the cluster.

* * * * *

UNITED STATES PATENT AND TRADEMARK OFFICE
CERTIFICATE OF CORRECTION

| | | |
|---|---|---|
| PATENT NO. | : 7,813,351 B2 | Page 1 of 1 |
| APPLICATION NO. | : 11/787008 | |
| DATED | : October 12, 2010 | |
| INVENTOR(S) | : Alok Shriram et al. | |

It is certified that error appears in the above-identified patent and that said Letters Patent is hereby corrected as shown below:

In column 10, line 22, in Claim 13, delete "last-m hops" and insert -- last m-hops --, therefor.

Signed and Sealed this
Thirtieth Day of August, 2011

David J. Kappos
*Director of the United States Patent and Trademark Office*